(12) United States Patent
McGuire

(10) Patent No.: US 10,100,934 B2
(45) Date of Patent: Oct. 16, 2018

(54) VALVE WITH MOVABLE VALVE SEAT

(71) Applicant: ELKHART BRASS MANUFACTURING COMPANY, INC., Elkhart, IN (US)

(72) Inventor: Kevin McGuire, New Paris, IN (US)

(73) Assignee: ELKHART BRASS MANUFACTURING COMPANY, INC., Elkhart, IN (US)

( * ) Notice: Subject to any disclaimer, the term of this patent is extended or adjusted under 35 U.S.C. 154(b) by 0 days.

(21) Appl. No.: 15/052,715

(22) Filed: Feb. 24, 2016

(65) Prior Publication Data

US 2016/0245411 A1 Aug. 25, 2016

Related U.S. Application Data

(60) Provisional application No. 62/120,799, filed on Feb. 25, 2015.

(51) Int. Cl.
| | |
|---|---|
| *F16K 1/228* | (2006.01) |
| *F16K 1/22* | (2006.01) |
| *F16K 31/52* | (2006.01) |
| *F16K 31/524* | (2006.01) |

(52) U.S. Cl.
CPC .............. *F16K 1/228* (2013.01); *F16K 1/224* (2013.01); *F16K 31/521* (2013.01); *F16K 31/52441* (2013.01); *Y10T 137/0525* (2015.04); *Y10T 137/6048* (2015.04)

(58) Field of Classification Search
CPC ........ F16K 1/228; F16K 1/224; F16K 1/2266; F16K 31/521; F16K 31/52441; Y10T 137/0525; Y10T 137/6048–137/6055

USPC ........ 251/174, 162–163, 192, 305–308, 251; 137/15.25, 315.22–315.24
See application file for complete search history.

(56) References Cited

U.S. PATENT DOCUMENTS

| | | | | |
|---|---|---|---|---|
| 2,934,309 | A | * | 4/1960 | Morser ................. F16K 1/2285 251/162 |
| 3,090,595 | A | * | 5/1963 | Harris ............... F16K 31/52425 251/258 |
| 3,214,132 | A | | 10/1965 | Goldthorpe |
| 3,245,653 | A | * | 4/1966 | Lavigueur ............... F16K 5/201 251/174 |
| 3,627,259 | A | | 12/1971 | Williams |
| 3,746,302 | A | * | 7/1973 | Larsen .................... F16K 5/185 251/163 |

(Continued)

FOREIGN PATENT DOCUMENTS

| | | |
|---|---|---|
| JP | 10-238637 | 9/1998 |
| JP | 2001-050401 | 2/2001 |

OTHER PUBLICATIONS

Elkhart Brass Manufacturing, Co., "Unibody Valve" brochure, at least as early as Feb. 25, 2015.

*Primary Examiner* — John Bastianelli
(74) *Attorney, Agent, or Firm* — Faegre Baker Daniels LLP

(57) ABSTRACT

A valve having a valve body mechanically linked to the corresponding valve seat such that the valve seat automatically moves to a position spaced from the valve body as the valve body is moved from a closed position to an open position is disclosed. The resulting spaced-apart configuration of the valve body and valve seat in the open position eliminates impingement of the valve body on the valve seat in the open position.

18 Claims, 10 Drawing Sheets

(56) References Cited

U.S. PATENT DOCUMENTS

| | | | |
|---|---|---|---|
| 4,206,903 A * | 6/1980 | Scaramucci | F16K 1/2261 |
| | | | 251/174 |
| 4,228,816 A | 10/1980 | Aoki | |
| 4,262,691 A * | 4/1981 | Kacal | F16K 5/0626 |
| | | | 251/174 |
| 4,519,578 A | 5/1985 | Boeckman et al. | |
| 4,576,360 A | 3/1986 | Lew | |
| 4,676,480 A * | 6/1987 | Garceau | F16K 5/201 |
| | | | 251/159 |
| 4,718,444 A * | 1/1988 | Boelte | F16K 5/0636 |
| | | | 251/174 |
| 5,611,516 A * | 3/1997 | Reinicke | F16K 5/201 |
| | | | 251/163 |
| 6,340,029 B1 | 1/2002 | Jun | |
| 6,681,793 B2 * | 1/2004 | Mike | F16K 5/0636 |
| | | | 137/15.22 |
| 8,123,195 B2 | 2/2012 | Iwabuchi | |
| 2010/0276621 A1 | 11/2010 | Zwick | |
| 2013/0068981 A1 | 3/2013 | Hotta et al. | |

\* cited by examiner

VALVE WITH MOVABLE VALVE SEAT

CROSS-REFERENCE TO RELATED APPLICATION

This application claims the benefit under Title 35, U.S.C. § 119(e) of U.S. Provisional Patent Application Ser. No. 62/120,799, entitled VALVE, filed on Feb. 25, 2015, the entire disclosure of which is expressly incorporated by reference herein.

The present disclosure relates to a valve including a valve seat which is automatically moved to a position spaced from the valve body as the valve body is opened and, more particularly, to a valve body that is mechanically linked to a movable valve seat such that actuation of the valve body from a closed position to an open position automatically actuates the valve seat to a position spaced from the valve body.

BACKGROUND/SUMMARY

Valves may be utilized to selectively open and close a fluid passage through a valve housing to selectively allow or prevent flow through the passage. Specifically, the valve body may be actuated into a position in which it engages a valve seat to seal the passage such that a fluid may not traverse the passage (or at least flow is restricted relative to a valve open position). The valve can further be actuated to a position in which it is not fully seated against the valve seat to allow a flow of fluid through the passage.

Referring to FIG. 1, valve 20 includes housing 22 defining inlet 24 and outlet 26 which are fluidly connected by a passage defined within housing 22 and extending between inlet 24 and outlet 26. Inlet 24 and outlet 26 are fluidly connected so that flow F can enter housing 22 at inlet 24, traverse the passage and exit housing 22 at outlet 26. Valve 20 is a bi-directional valve, which means that inlet 24 and outlet 26 may be functionally switched such that fluid can flow in a direction opposite to the direction of flow F illustrated in FIG. 1 so that flow through valve 20 enters through "outlet" 26, traverses the passage defined within housing 22 and exits housing 22 at "inlet" 24.

Valve body 28 is rotatably supported on trunnion 31 relative to housing 22. Actuation of trunnion 31 actuates valve body 28 between the open position illustrated in FIG. 1 in which valve body 28, which is a butterfly valve, is aligned with the direction of flow F to allow flow F to enter housing 22 at inlet 24, traverse the passage through housing 22 and exit housing 22 at outlet 26, to a closed position in which valve body 28 is transverse to the passage through housing 22 such that valve body 28 blocks the passage through housing 22 to restrict flow F through the passage.

In the closed position, valve body 28 sealingly engages valve seat 30 about perimeter 32 of valve body 28 to block the flow of fluid through valve 20. In the open configuration illustrated in FIG. 1, valve body 28 presses against valve seat 30 in a non-uniform manner, i.e., valve body 28 presses against valve seat 30 at only two discrete areas of contact, one of which is illustrated in FIG. 2. Contrary to this concentration of force at only two areas on valve seat 30 in the open position, valve body 28 provides a substantially uniform force about perimeter 32 in the closed position because perimeter 32 sealingly engages (i.e., frictionally engages) valve seat 30 uniformly about the annular valve seat.

As illustrated in FIG. 2, in the open configuration valve body 28 impinges on valve seat 30 and forms depression 34, as illustrated in FIG. 3. If valve body 28 maintains the open position for an extended period of time, valve seat 30, which may be formed of a thermoplastic elastomer, may plastically deform at depression 34. Even if valve seat 30 is not plastically deformed to define depression 34, valve seat 30 may not have sufficient elastic properties to fully return to the shape it held prior to the formation of depression 34. In either event, if valve body 28 is closed after depressions 34 are formed (one each, located 180 degrees apart about the inner circumference of valve seat 30, if the valve is left in the fully open position), then depressions 34 will cause leak points in the valve because valve body 28 will not be able to fully seal around its entire perimeter 32, because depressions 34 will be spaced from perimeter 32 of valve body 28. Depressions 34 can also be formed at positions spaced less than 180 degrees if the valve is left in an open position that does not correspond to its fully opened position.

To obviate the formation of depressions 34, a valve in accordance with the present disclosure mechanically links the valve body to the valve seat such that the valve seat automatically moves to a position spaced from the valve body as the valve body is moved from a closed position to an open position. The resulting spaced-apart configuration of the valve body and valve seat in the open position eliminates impingement and the resulting depressions 34.

In an exemplification thereof, the present disclosure provides a valve including a housing having an inlet and an outlet fluidly connected by a passage, so that a flow of fluid can enter the housing at the inlet, traverse the passage, and exit the housing at the outlet. The valve of this exemplification of the present disclosure further includes a valve body movable between a valve body closed position and a valve body open position, the valve body blocking the passage when the valve body maintains the valve body closed position such that the valve body is operable to restrict the flow of fluid through the passage when the valve body maintains the valve body closed position, the valve body opening the passage when the valve body maintains the valve body open position such that the valve body is operable to allow the flow through the passage when the valve body maintains the valve body open position. The valve of this exemplification of the present disclosure further includes a valve seat positioned within the housing and movable relative to both the housing and the valve body between a seating position and a valve seat open position, the valve body seating with the valve seat to enable restriction of the flow of fluid through the passage when the valve body maintains the valve body closed position and the valve seat maintains the seating the position, the valve seat spaced from the valve body when the valve seat maintains the valve seat open position such that the valve body cannot contact the valve seat when the valve seat maintains the valve seat open position, whereby the valve body does not impinge on the valve seat when the valve seat maintains the valve seat open position and the valve body maintains the valve body open position, the valve seat mechanically link to the valve body such that the valve seat automatically moves from the seating position to the valve seat open position as the valve body is moved from the valve body closed position to the valve body open position. In a variation of this exemplification of the present disclosure, an actuator is interposed between the valve body and the valve seat and is operable to move the valve seat from the seating position to the valve seat open position in response to the valve body moving from the valve body closed position to the valve body open position. The actuator may comprise a cam secured relative to the valve body such that the cam actuates the valve seat from the seating position to the valve seat open position as the valve body is moved from the valve body closed position to the valve body open position.

In another exemplification thereof, the present disclosure provides a valve including a housing having an inlet and an outlet fluidly connected by a passage, whereby a flow of fluid can enter the housing at the inlet, traverse the passage, and exit the housing at the outlet. This exemplification of the present disclosure further includes a valve body movable between a valve body closed position and a valve body open position, the valve body blocking the passage when the valve body maintains the valve body closed position such that the valve body is operable to restrict the flow of fluid through the passage when the valve body maintains the valve body closed position, the valve body opening the passage when the valve body maintains the valve body open position such that the valve body is operable to allow the flow through the passage when the valve body maintains the valve body open position. This exemplification of the present disclosure further includes a valve seat positioned within the housing, the valve seat movable relative to both the housing and the valve body between a seating position and a valve seat open position, the valve body seating with the valve seat to enable restriction of the flow of fluid through the passage when the valve body maintains the valve body closed position and the valve seat maintains the seating position, the valve seat spaced from the valve body when the valve seat maintains the valve seat open position such that the valve body cannot contact the valve seat when the valve seat maintains the valve seat open position, whereby the valve body does not impinge on the valve seat when the valve seat maintains the valve seat open position and the valve body maintains the valve body open position. This exemplification of the present disclosure further includes means for mechanically linking the valve body to the valve seat and for automatically moving the valve seat from the seating position to the valve seat open position as the valve body is moved from the valve body closed position to the valve body open position. In a variation of this exemplification of the present disclosure, the means for mechanically linking the valve body to the valve seat may comprise a cam secured relative to the valve body such that the cam actuates the valve seat from the seating position to the valve seat open position as the valve body is moved from the valve body closed position to the valve body open position.

In a further exemplification thereof, the present disclosure provides a method of preventing deformation of a valve seat of a valve when a valve body of the valve maintains an open position, the valve including: a housing having an inlet and an outlet fluidly connected by a passage, whereby a flow of fluid can enter the housing at the inlet, traverse the passage, and exit the housing at the outlet; the valve seat and the valve body positioned in the housing; the valve body movable between a valve body closed position and a valve body open position, the valve body blocking the passage when the valve body maintains the valve body closed position to enable restriction of the flow of fluid through the passage when the valve body maintains the valve body closed position, the valve body opening the passage when the valve body maintains the valve body open position to enable allowance of the flow through the passage when the valve body maintains the valve body open position. In this exemplification of the present disclosure, the method comprises the steps of: automatically moving the valve seat relative to both the housing and the valve body from a seating position in which the valve body seats with the valve seat such that the valve body is operable to restrict the flow of fluid through the passage when the valve body maintains the valve body closed position and the valve seat maintains the seating position to a valve seat open position in which the valve seat is spaced from the valve body such that the valve body cannot contact the valve seat when the valve seat maintains the valve seat open position when the valve body is moved from the valve body closed position to the valve body open position, whereby the valve body does not impinge on the valve seat when the valve seat maintains the valve seat open position and the valve body maintains the valve body open position.

The above-mentioned and other features of the invention and the manner of obtaining them will become more apparent and the invention itself will be better understood by reference to the following description of exemplary embodiments of the invention taken in conjunction with the accompanying drawings. These above-mentioned and other features of the invention may be used in any combination or permutation.

Figure 1:
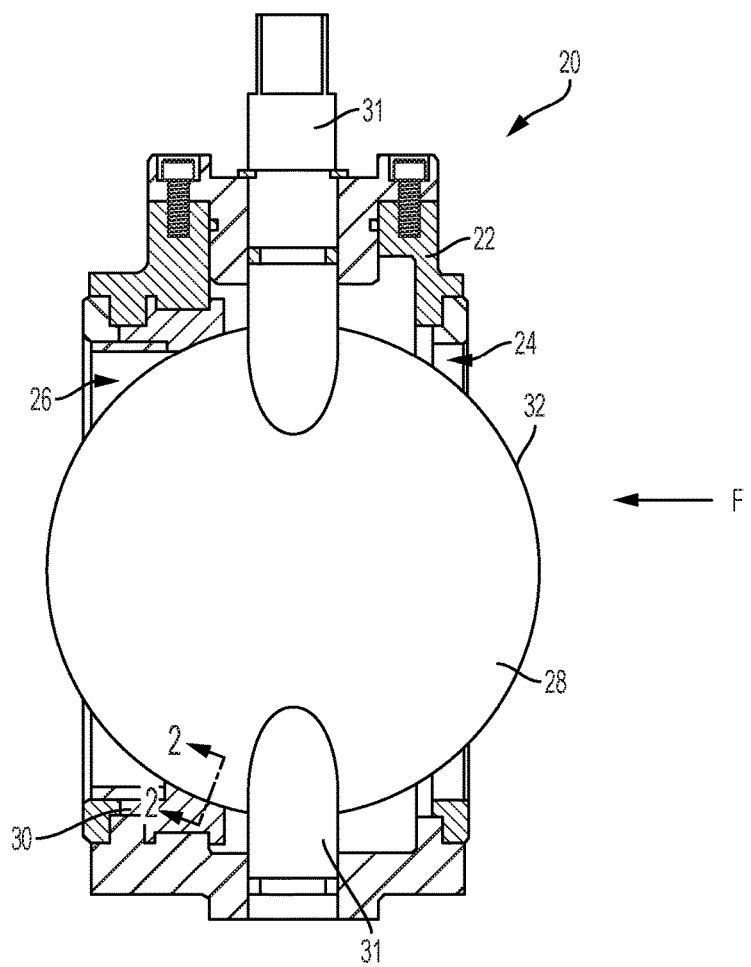
FIG. 1 is an elevation, partial sectional view illustrating a butterfly valve together with a stationary valve seat, with the butterfly valve shown in the open position.
Figure 2:
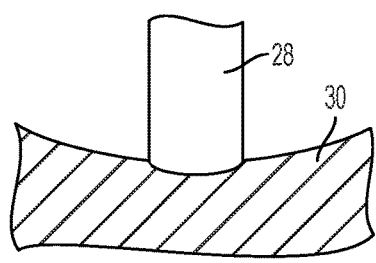
FIG. 2 is a partial view of the interaction of the butterfly valve and valve seat of FIG. 1, showing the valve body in the open position.
Figure 3:
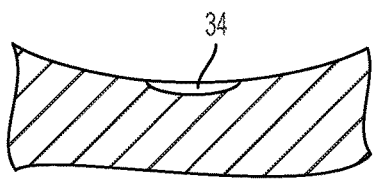
FIG. 3 is a partial sectional view illustrating the valve seat of the valve of FIG. 1 showing a depression formed after the valve body has maintained the open position for a period of time.
Figure 4:
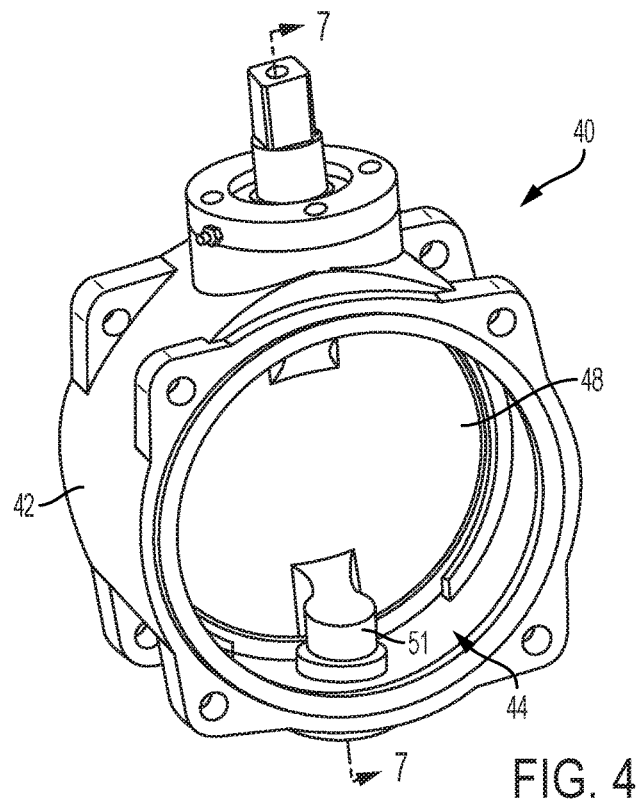
FIG. 4 is a perspective view of a valve in accordance with the present disclosure.
Figure 5:
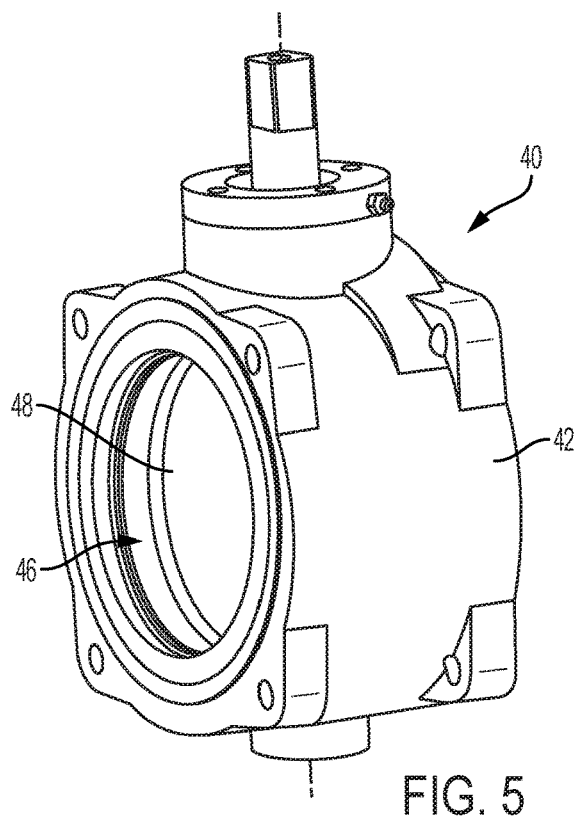
FIG. 5 is another perspective view of the valve of FIG. 4.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, and such exemplifications are not to be construed as limiting the scope of the invention in any manner.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

FIGS. 4, 5 and 7-9 illustrate valve 40 including housing 42 defining inlet 44 (FIGS. 4 and 7-9) and outlet 46 (FIGS. 5 and 7-9) which are fluidly connected by a passage defined within housing 42 and extending between inlet 44 and outlet 46. Inlet 44 and outlet 46 are fluidly connected so that flow $F_1$ (FIG. 7) can enter housing 42 at inlet 44, traverse the passage and exit housing 42 at outlet 46. Valve 40 is a bi-directional valve. Specifically, the operation of inlet 44 and outlet 46 may be switched such that "outlet" 46 accommodates flow $F_2$ (FIG. 7) entering valve 40 therethrough to traverse the passage and exit housing 42 at "inlet" 44.

Figure 7:
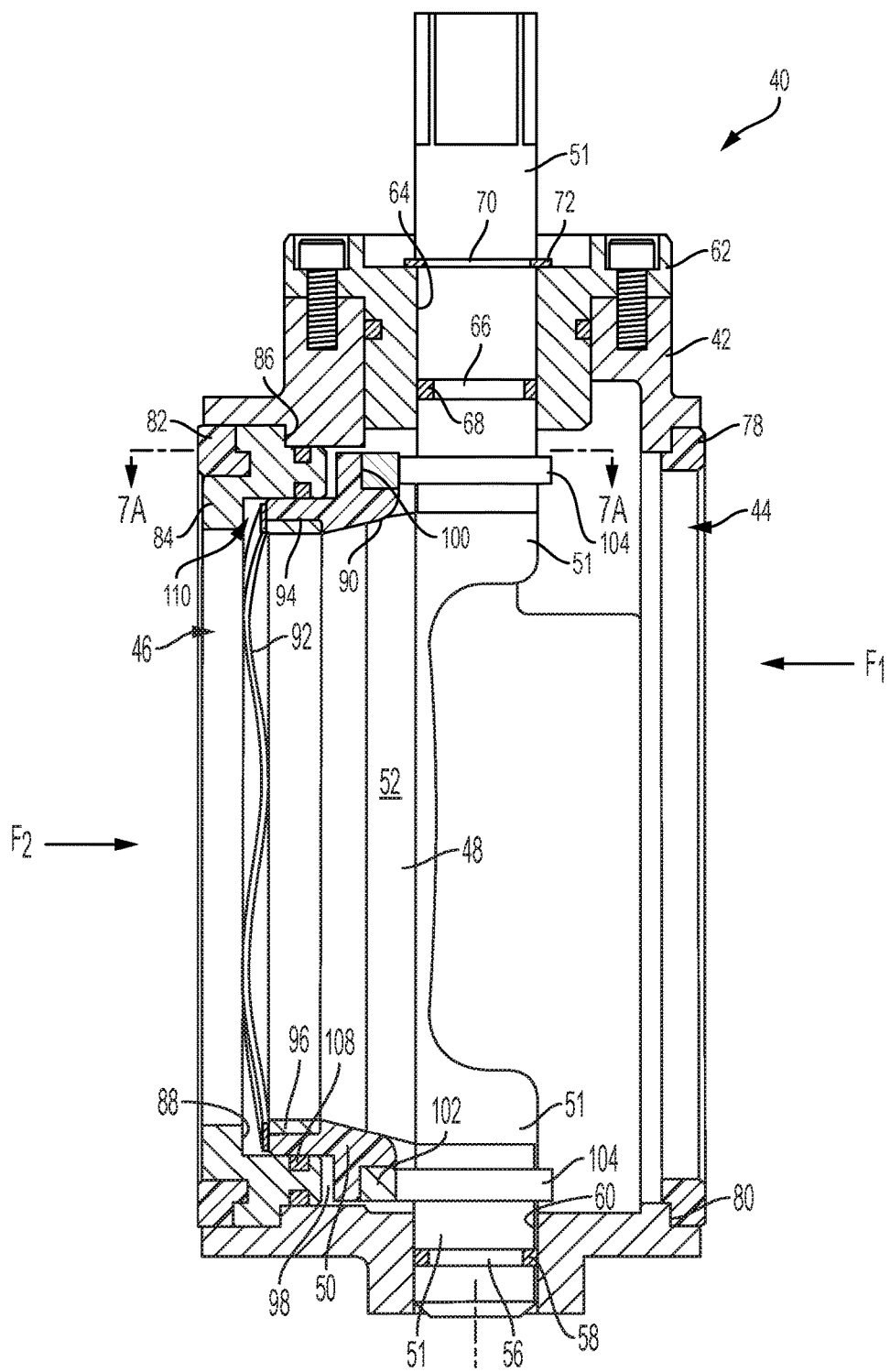
FIG. 7 is an elevation, partial sectional view illustrating a valve in accordance with the present disclosure in the closed position.
Figure 8:
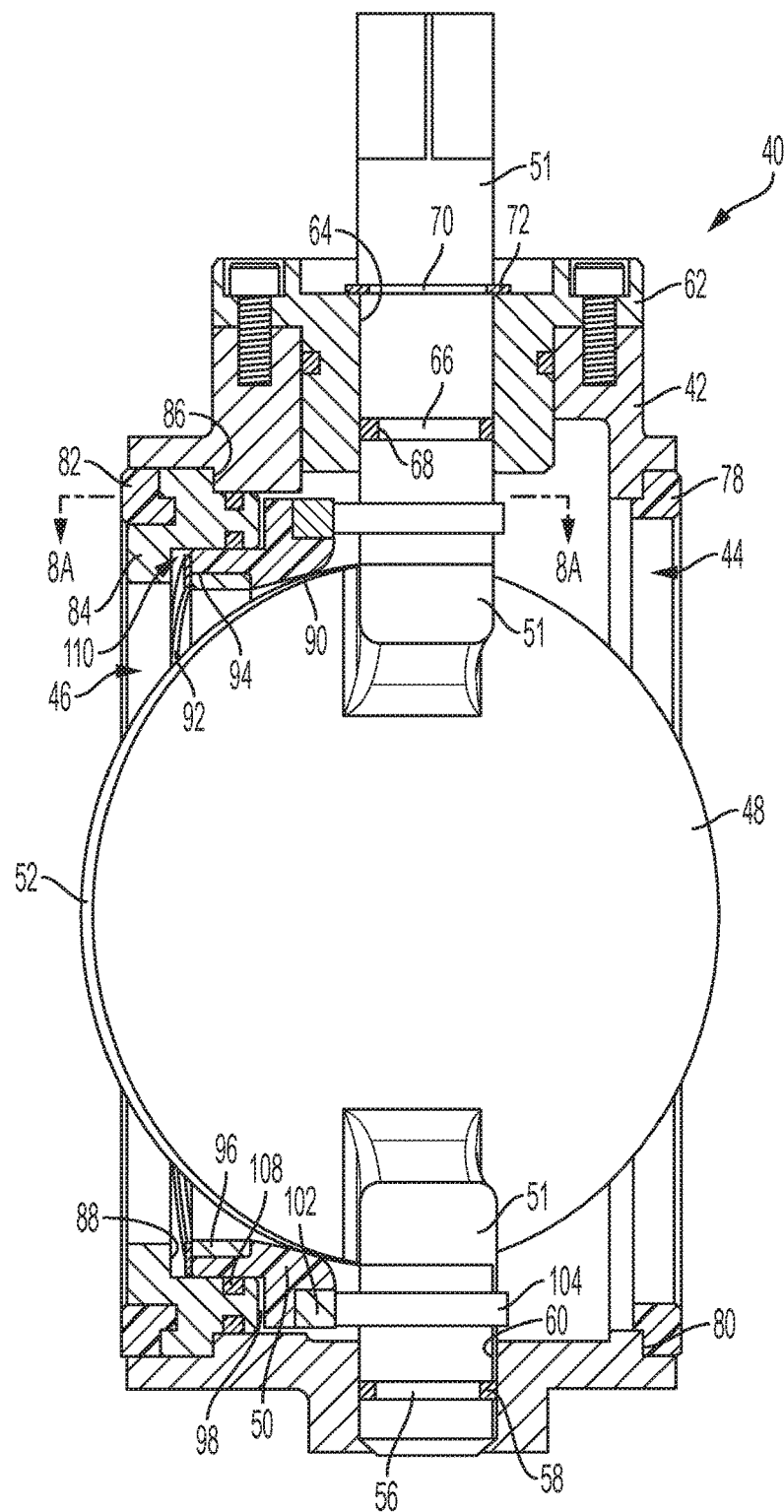
FIG. 8 is an elevation, partial sectional view illustrating the valve of FIG. 7, with the valve body moved from the closed position toward a fully open position.
Figure 9:
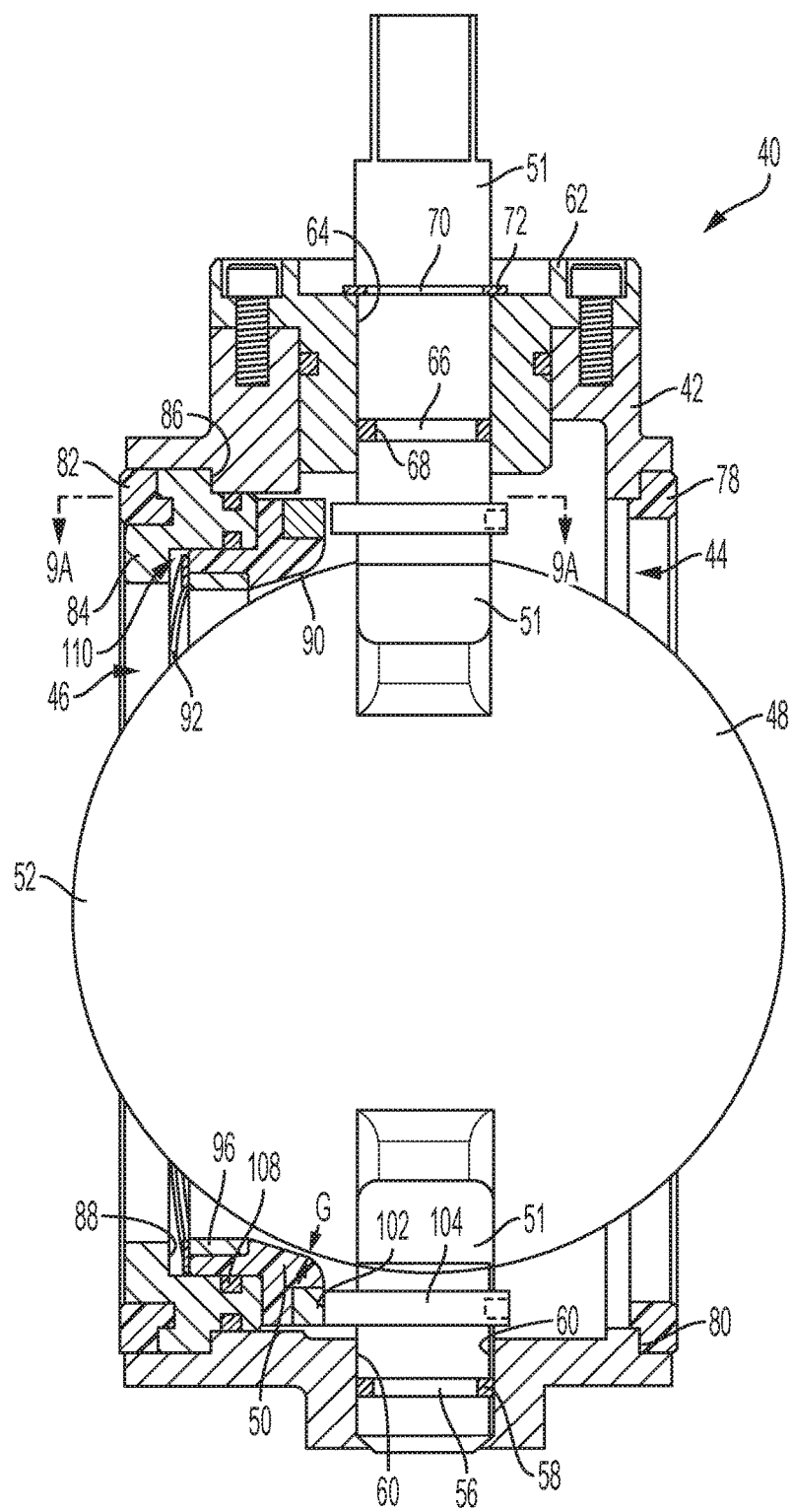
FIG. 9 is an elevation, partial sectional view illustrating the valve of FIGS. 7 and 8 in a fully open position.

Valve body 48 is rotatably supported on trunnion 51 relative to housing 42, as best shown in FIGS. 7-9. In certain embodiments, trunnion 51 and valve body 48 may be monolithically and integrally formed as a single piece, e.g., as a manganese bronze casting. Referring to FIGS. 7-9, trunnion 51 can be seen extending radially outwardly from valve body 48 (relative to the center of valve body 48) at two positions along perimeter 52 of valve body 48. Specifically, trunnion 51 extends from two mutually opposite areas separated by 180 degrees along circular perimeter 52 of valve body 48. As illustrated in FIGS. 7-9, a lower portion of trunnion 51 includes a groove 56 accommodating O-ring 58 to seal the lower portion of trunnion 51 relative to housing 42. Housing 42 includes annular support wall 60 defining an aperture into which lower trunnion 51 can be positioned to rotatably support valve body 48 relative to housing 42. At the top of housing 42, adapter 62 similarly includes annular support wall 64 forming an aperture into which the upper portion of trunnion 51 is received to rotatably support valve body 48 relative to housing 42. The upper portion of trunnion 51 includes groove 66 into which O-ring 68 is fitted to seal the upper portion of trunnion 51 relative to adapter 62. The upper portion of trunnion 51 further includes groove 70 accommodating snap ring 72. Snap ring 72 is operable to set the relative position of valve body 48 along the longitudinal axis of trunnion 51 relative to housing 42.

Figure 6:
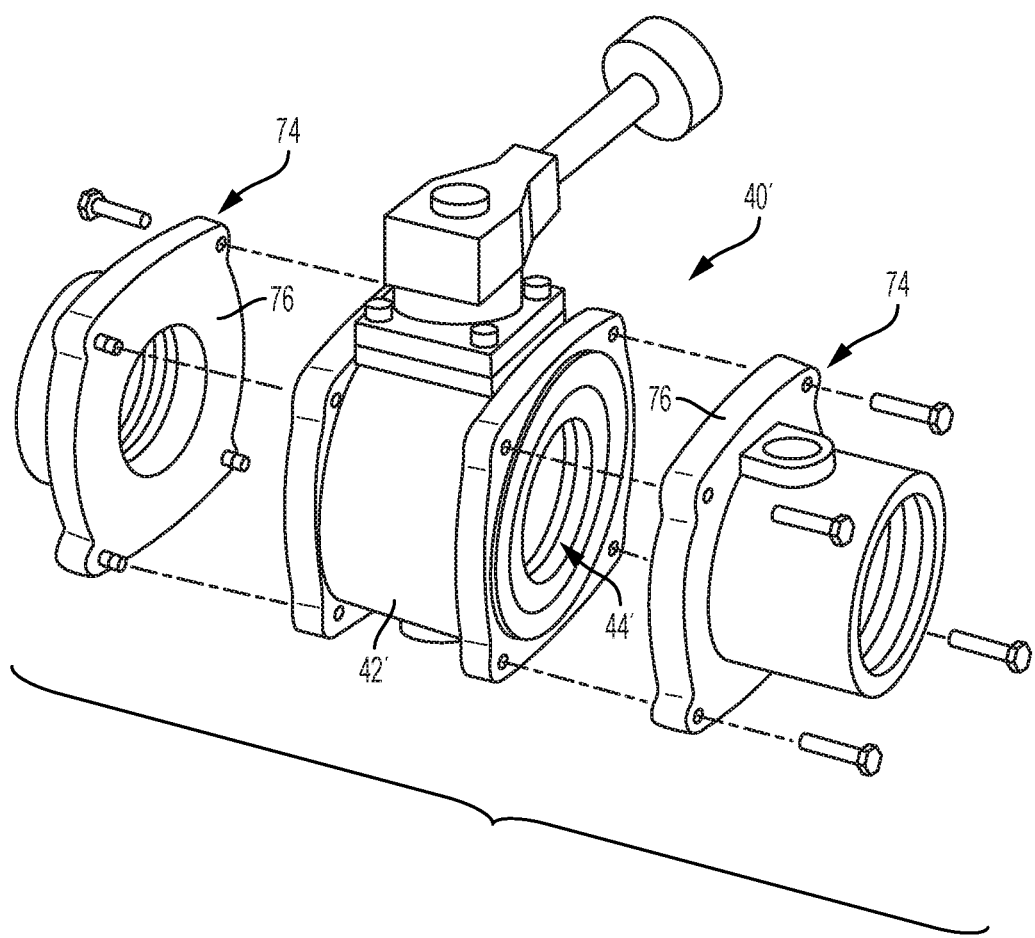
FIG. 6 is a perspective, exploded view of a valve body in accordance with the present disclosure.

As illustrated, lag bolts are utilized to secure adapter 62 to housing 42. Adapter 62 may take different forms to accommodate different desired actuators for valve 40. An alternative form of the upper portion of housing 42 and adapter 62 is illustrated, e.g., in FIG. 6. But for these aspects, the valve illustrated in FIG. 6 is identical to the valve illustrated in FIGS. 4, 5 and 7-9. FIG. 6 includes primed reference numerals designating parts corresponding to the valve illustrated in FIGS. 4, 5 and 7-9. The parts having primed reference numerals in FIG. 6 are identical to their non-primed counterparts in the remaining views (with the exception of the upper portion of housing 42 adjacent to the adapter) and, therefore, primed and non-primed reference numerals are used interchangeably in this document to reference the same part, it being understood that such parts in the exemplification of FIG. 6 are associated with an embodiment having a different upper housing portion and adapter as compared to the embodiment of FIGS. 7-9.

Actuation of trunnion 51 may be effected by securing any one of a number of alternative actuators relative to the exposed end of trunnion 51, which includes a portion having a non-round (e.g., polygonal) cross section transverse to the longitudinal axis of trunnion 51 to facilitate rotationally locking such an actuator relative to trunnion 51. Exemplary actuators include, e.g., the direct handle, remote handle, rack & sector, twist lock, gear, electric and slow close actuators referred to in the "Unibody Apparatus" brochure, submitted on even date herewith in an Information Disclosure Statement, and as further depicted and described in U.S. Pat. No. 8,714,518, the entire disclosures of which are hereby explicitly incorporated by reference herein.

Referring to FIG. 6, end caps 74 are bolted to housing 42' via four bolts positioned through the perimeter of each flange 76. The end cap 74 secured to the end of housing 42' adjacent inlet 44' includes a threaded tubular extension for a connection to an inlet pipe. Similarly, the end cap 74 secured to outlet 46 (opposite inlet 44') presents a threaded tubular portion for securement to an outlet pipe downstream of valve 40'. Referring to FIGS. 7-10, face seal 78 surrounds inlet 44 and is positioned atop annular shoulder 80 of housing 42. As illustrated in FIG. 7, face seal 78 sits proud of housing 42 about inlet 44. Flange 76 of end cap 74 (FIG. 6) presents an inward face which contacts face seal 78 about its entire periphery such that face seal 78 is compressed between flange 76 of end cap 74 and annular shoulder 80 of housing 42' to effect sealing of end cap 74 to housing 42' at inlet 44'. Face seal 78 may be formed of a thermoplastic elastomer such as, Hytrel G 6356 available from E.I. DuPont de Nemours and Company.

Another end cap 74 (FIG. 6) is similarly secured to housing 42' about outlet 46. Annular face seal 82 (FIG. 7) surrounds outlet 46 and is positioned to abut annular seat retainer 84. Annular seat retainer 84 abuts annular shoulder 86 formed in housing 42' adjacent to outlet 46. With seat retainer 84 positioned flush with annular shoulder 86, and face seal 82 positioned with one side flush with seat retainer 84 and an opposite side proud of seat retainer 84, as shown in FIG. 7, face seal 82 sits proud of housing 42 adjacent outlet 46. Flange 76 (FIG. 6) presents an inward face which is pressed against face seal 82 about its entire periphery such that face seal 82 is compressed between housing 42' and end cap 74 when end cap 74 is operably secured to housing 42'. In this way, valve 40' is secured in fluid tight relationship to both an inlet feed pipe an outlet delivery pipe extending therefrom, respectively. Face seal 78 may be formed of a thermoplastic elastomer such as, e.g., Hytrel G 6356 available from E.I. DuPont de Nemours and Company. Seat retainer 84 may be formed of 360 brass, which is a copper-zinc alloy material made in accordance with ASTM B16. End caps 74 will similarly be secured to housing 42 of valve 40 illustrated in FIGS. 4, 5 and 7-10.

Referring to FIG. 7, seat retainer 84 houses a pair of O-rings, including an outer radial seal interposed between seat retainer 84 and housing 42 and an inner radial seal (108) interposed between seat retainer 84 and valve seat 50. As illustrated in FIG. 7, valve seat 50 presents an annular surface against which perimeter 52 of valve body 28 abuts and is frictionally engaged therewith when valve body 48 maintains the closed position illustrated in FIG. 7. Specifically, the entire perimeter 52 of valve body 48 is nominally frictionally engaged with the entire annular perimeter of valve seat 50 when valve body 48 maintains the closed position. In the closed position, valve body 48 blocks the passage between inlet 44 and outlet 46, i.e., it restricts the flow of fluid between inlet 44 and outlet 46.

In certain exemplifications of the present invention, the closed position of valve body 48 may not present 100% blockage of the passage between inlet 44 and outlet 46. That is, the closed position of valve body 48 may be designed to allow some amount of "leakage" past valve body 48, such that fluid flow through valve 40 is not completely eliminated. In any event, the closed position of valve body 48 will correspond to a position in which fluid flow from inlet 44 to outlet 46 is restricted to a much greater extent than when valve body 48 maintains the open position, such as less than 5% of full flow. In alternative embodiments, the closed position of valve body 48 will correspond to nominally zero flow through valve 40.

As illustrated in FIG. 7, seat retainer 84 presents inwardly facing annular spring shoulder 88. Wave spring 92, shown in FIG. 7 as a wave washer, is positioned between annular spring shoulder 88 of seat retainer 84 and an opposing axial end surface of valve seat 50. Wave spring 92 biases valve seat 50 toward valve body 48. Valve seat 50 includes annular groove 94 into which seat ring 96 is positioned. While valve seat 50 is made of a resiliently deformable material such as Hytrel G 6356 available from E.I. DuPont de Nemours and Company, seat ring 96 is made of metal, e.g., 360 brass. Because seat ring 96 is made of metal, it provides a durable bearing surface for stainless steel wave spring 92. In an exemplary embodiment, wave spring 92 may be made of 17-7 stainless steel.

With butterfly flapper 48 in the closed position, as illustrated in FIG. 7, perimeter 52 of valve body 48 frictionally engages seat surface 90 of valve seat 50 to close valve 40. In this position, valve seat 50 is biased toward valve body 48 by wave spring 92 and defines a maximum distance from seat retainer 84 and outlet 46, i.e., the size of the gap (shown as spring space 110 in FIGS. 7A-9A) between seat retainer and seat ring 96 is maximized and wave spring 92 is allowed to expand to fill this gap. Referring to FIG. 7, this configuration forms annular seat space 98 between valve seat 50 and seat retainer 84. This position of valve seat 50 corresponds to a seating position in which valve seat 50 is available to seat with valve body 48 to block the passage between inlet 44 and outlet 46 to restrict (up to prevent) a flow ($F_1$ or $F_2$) through valve 40.

Referring to FIGS. 8 and 9, as valve body 48 is actuated from the closed position illustrated in FIG. 7 to the intermediate position illustrated in FIG. 8 and then to the fully open position illustrated in FIG. 9, valve seat 50 is actuated against the biasing force of spring 92 such that valve seat 50 moves toward outlet 46 and annular seat space 98 is closed. Spring 92 also compresses, as shown by a comparison of FIGS. 7 and 9, as the gap between seat retainer and seat ring 96 (i.e., spring space 110 as shown in FIGS. 7A-9A) is reduced from its maximum size of FIG. 9 to its minimum size of FIG. 7.

This position of valve seat 50 corresponds to a valve seat open position in which valve seat 50 is spaced from valve body 48. Specifically referring to FIG. 9, with valve seat 50 maintaining the valve seat open position and valve body 48 consequently maintaining the valve body open position, valve seat 50 is spaced from valve body 48 a minimum distance G. In an exemplary embodiment, with valve seat 50 maintaining the valve seat open position and valve body 48 maintaining the valve body open position, the minimum distance G is about 0.005 inches. With this spacing, valve body 48 cannot contact valve seat 50 when the valve seat maintains the valve seat open position and, therefore, valve body 48 does not impinge on valve seat 50 when valve body 48 maintains the valve body open position and valve seat 50 maintains the valve seat open position.

Figure 10:
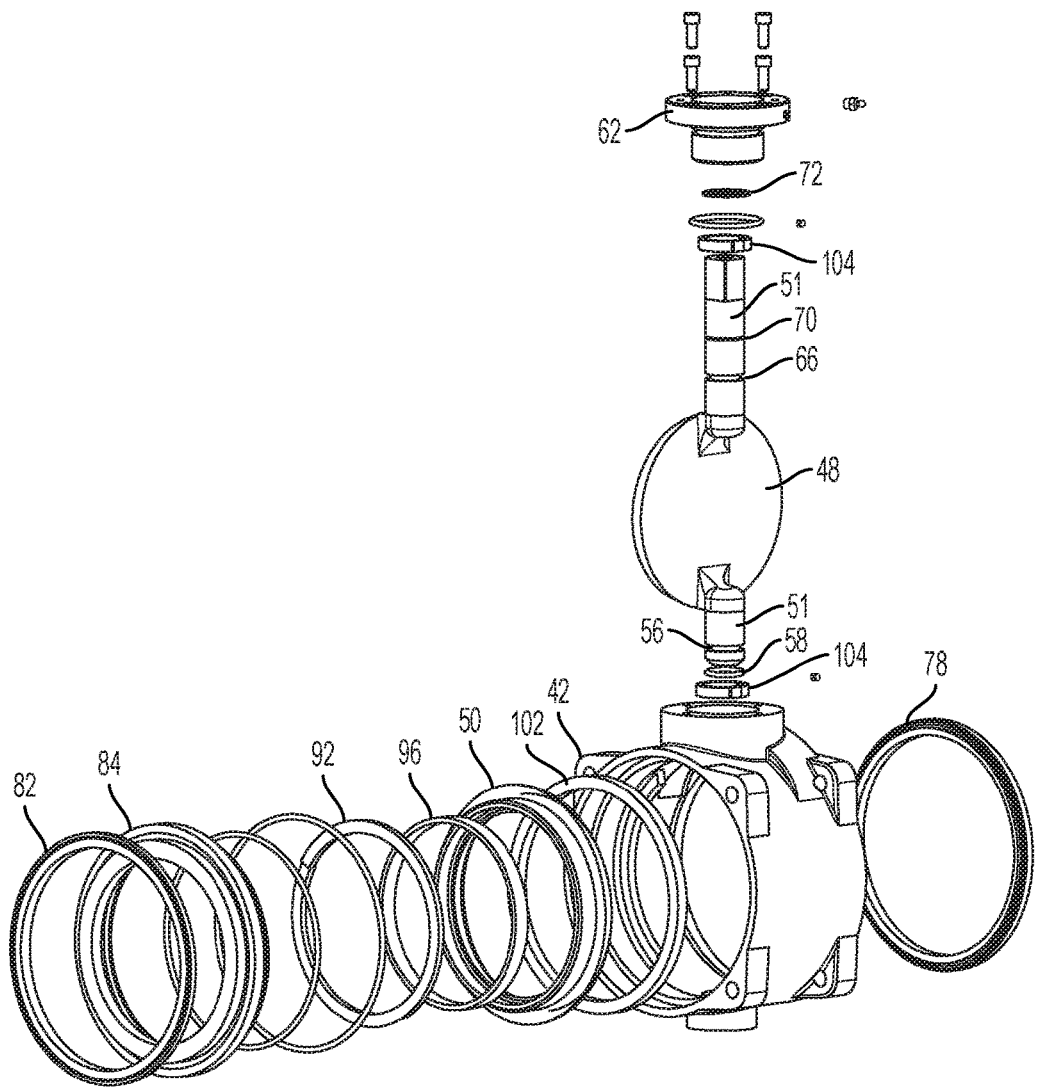
FIG. 10 is a perspective, exploded view illustrating the valve of FIGS. 4, 5 and 7-9.

Referring to FIGS. 7-10, valve seat 50 includes annular cam follower channel 100 (FIG. 7) into which cam follower 102 is positioned. Each end of trunnion 51 includes a cam (104) secured thereto, as best seen in FIG. 10, and bearing against cam follower 102, as best seen in FIG. 7. In an exemplary embodiment, cam follower 102 is made of 3604 forging brass. In alternative embodiments, cam follower 102 may be made out of 85-5-5-5 brass (i.e., a brass nominally containing 85% copper and 5% each of tin, lead and zinc, it being understood that certain impurities may also be present within acceptable limits).

Referring to FIGS. 7-10, two cams 104 are secured to opposite ends of trunnion 51. In the exemplary embodiment illustrated in FIGS. 7A, 8A and 9A, set screws are utilized to effect securement of cams 104 to trunnion 51. Each cam 104 includes a central aperture sized to allow passage of trunnion 51 therethrough without significant clearance. With trunnion 51 positioned through the central aperture of each cam 104, a set screw is threaded through a radial aperture in each cam 104 and into frictional engagement with trunnion 51. Each cam 104 includes cam lobe 106. When secured to trunnion 51, cams 104 protrude radially and substantially orthogonally from trunnion 51, with cam lobes 106 extending further radially from the longitudinal axis of trunnion 51 than any other part of cams 104. Note that while FIGS. 7A, 8A and 9A illustrate a single cam 104, each cam 104 secured at opposite upper and lower portions of trunnion 51 will operate in the same manner.

Figure 7A:
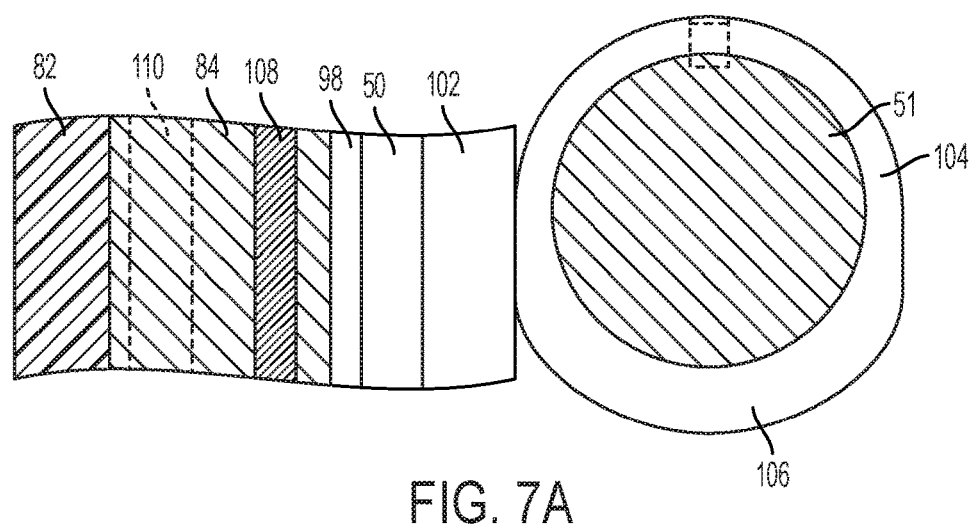
FIG. 7A is a partial plan, sectional view thereof illustrating a cam follower engagement.

Referring to FIGS. 7 and 7A, with valve body 48 positioned in the fully closed position, cam lobe 106 does not contact cam follower 102 and, therefore, wave spring 92 is allowed to bias valve seat 50 toward valve body 48, maximizing annular seat space 98 as described above. In this position, wave spring 92 also expands spring space 110. Again, while only a single cam 104 is illustrated in FIG. 7A, both cams 104 at opposing ends of trunnion 51 are positioned and configured to operate in the same manner on opposite sides of valve body 48.

Figure 8A:
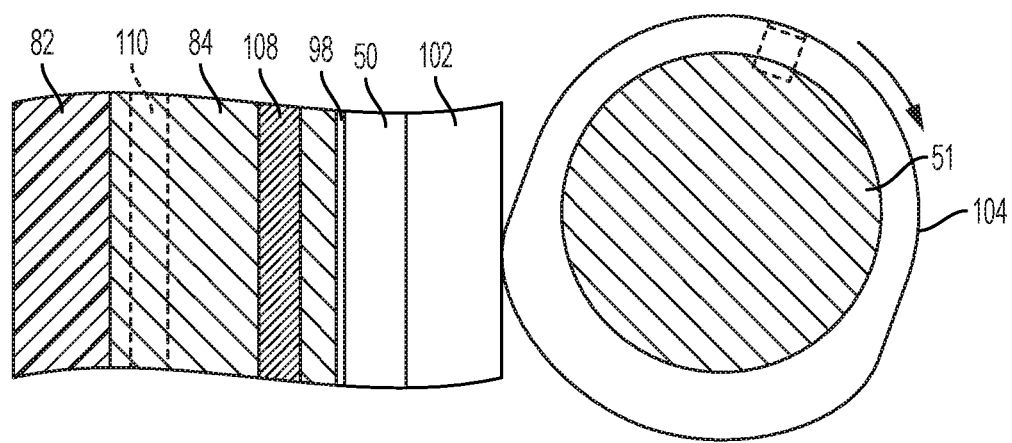
FIG. 8A is a partial plan, sectional view thereof illustrating a cam follower engagement.
Figure 9A:
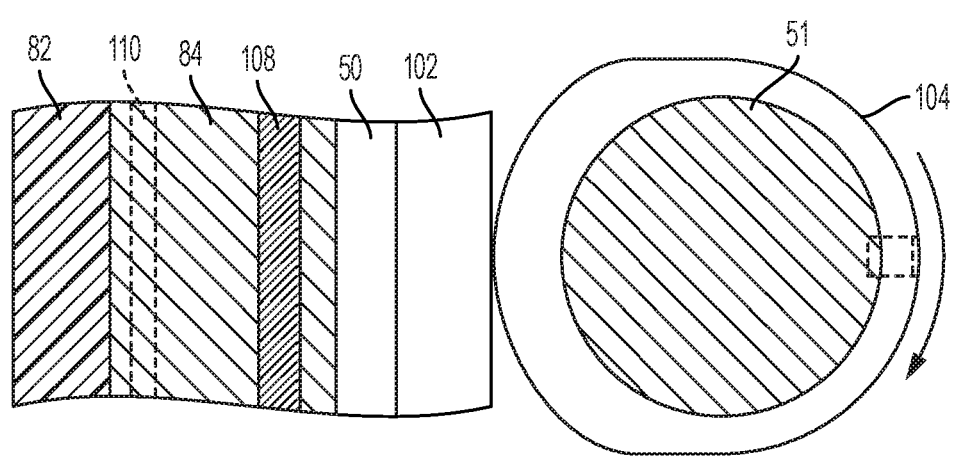
FIG. 9A is a partial plan, sectional view thereof illustrating a cam follower engagement.

Referring to FIGS. 8 and 8A, as trunnion 51 is actuated to move valve body 48 into an intermediate position between the fully closed position illustrated in FIG. 7 and toward the fully open position illustrated in FIG. 9, cam follower 102 encounters cam lobe 106, with cam lobe 106 pressing cam follower 102 away from trunnion 51 and, consequently, moving valve seat 50 against the biasing force of wave spring 92 to decrease the size of both annular seat space 98 and spring space 110 and space valve seat 50 from valve body 48. In an exemplary embodiment, cam lobe 106 contacts cam follower 102 almost immediately upon actuation from the fully closed position, illustrated, e.g., in FIG. 7A. In an alternative exemplification, cam lobe 106 may contact cam follower 102 when trunnion 51 is rotated about 5 degrees from the fully closed position illustrated in FIG. 7A toward an open position such as the ones illustrated, e.g., in FIGS. 8A and 9A. This movement continues as valve body 48 is actuated into the fully open position illustrated in FIGS. 9 and 9A.

In this way, trunnion 51, cams 104, cam follower 102 and wave spring 92 mechanically link valve seat 50 with valve body 48 such that valve seat 50 automatically moves from a seating position, in which it is positioned to be able to frictionally engage valve body 48, to a valve seat open position, in which valve seat 50 is spaced from valve body 48 to establish gap G therebetween (FIG. 9). Spacing of valve body 48 from valve seat 50 may begin as soon as valve body 48 is moved away from the fully closed position.

The mechanical linking of valve seat 50 and valve body 48 advantageously automatically brings about a spacing of valve seat 50 from valve body 48 when valve body 48 is actuated into the open position without requiring any electronic linkage or controller interconnected to the valve body actuator and valve seat 50. Valve seat 50 and valve body 48 are exclusively mechanically linked, that is, they are only mechanically linked. For example, they are not electronically linked.

In the fully open position illustrated in FIGS. 9 and 9A, butterfly flapper 48 is oriented such that the plate defining butterfly flapper 48 is oriented to provide the least obstruction possible to flow through valve 40. In the position illustrated in FIGS. 9 and 9A, cam lobe 106 fully engages cam follower 102. Stated another way, the radially outward most portion of cam 104 (relative to the longitudinal axis of trunnion 51) contacts cam follower 102 in this fully open position. In the fully open position illustrated in FIGS. 9 and 9A, both annular seat space 98 and spring space 110 are minimized. While annular seat space 98 is illustrated as going to zero (i.e., substantially eliminated) in FIG. 9A, some minimal annular seat space 98 may remain in the position illustrated in FIGS. 9 and 9A in order to avoid impingement of valve seat 50 upon seat retainer 84.

In the preceding description, "above" and "below" are used to describe the relative position of opposing portions of trunnion 51 and corresponding structure. These designations are used with reference to the orientation shown in the figures of the exemplary embodiment and are not meant to be limiting in any manner. A valve of the present disclosure may be positioned in any one of a number of orientations, e.g., such that trunnion 51 does not extend up and down but rather extends left to right.

The valve of the present disclosure is, in certain embodiments, intended for firefighting uses and applications. To this end, it is pressure rated to at least 250 psi and can be pressure tested to, e.g., 500 or 600 psi without failure. The valve meets or exceeds NFPA 1901 standards and can accommodate flow rates in the range of 0 to about 2194 gallons per minute at 10 psi loss across the valve. In exemplifications of valve 40, valve body 48 can be a 1.5 inch valve body, a 2 inch valve body, a 2.5 inch valve body and so on in half-inch increments up to, e.g., an 8 inch valve body.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A method of preventing deformation of a valve seat of a valve when a valve body of the valve maintains an open position, the valve including: a housing having an inlet and an outlet fluidly connected by a passage, whereby a flow of fluid can enter the housing at the inlet, traverse the passage, and exit the housing at the outlet; the valve seat and the valve body positioned in the housing; the valve body moveable between a valve body closed position and a valve body open position, the valve body blocking the passage when the valve body maintains the valve body closed position to enable restriction of the flow of fluid through the passage when the valve body maintains the valve body closed position, the valve body opening the passage when the valve body maintains the valve body open position to enable allowance of the flow of fluid through the passage when the valve body maintains the valve body open position, the valve body actuatable by a trunnion;

the method comprising the step of:

automatically moving the valve seat relative to both the housing and the valve body with a cam comprising a central aperture through which said trunnion is positioned, with a fastener removably, fixedly securing said cam to the trunnion from a seating position in which the valve body seats with the valve seat such that the valve body is operable to restrict the flow of fluid through the passage when the valve body maintains the valve body closed position and said valve seat maintains the seating position, to a valve seat open position in which the valve seat is spaced from the valve body such that the valve body cannot contact the valve seat when the valve seat maintains the valve seat open position when the valve body is moved from the valve body closed position to the valve body open position, whereby the valve body does not impinge on the valve seat when the valve seat maintains the valve seat open position and the valve body maintains the valve body open position.

2. The method of claim 1, wherein said step of automatically moving the valve seat comprises the step of mechanically actuating the valve body and thereby mechanically actuating the valve seat through a mechanical link between the valve seat and the valve body.

3. The method of claim 2, wherein said step of mechanically actuating the valve body and thereby mechanically actuating the valve seat comprises the step of:

actuating a trunnion extending from the valve body to rotate the valve body about a longitudinal axis of the trunnion, and thereby actuating a cam extending from the trunnion to actuate the valve seat against the biasing force of a spring.

4. The method of claim 1, wherein the valve body comprises a butterfly valve.

5. A valve, comprising:

a housing having an inlet and an outlet fluidly connected by a passage, whereby a flow of fluid can enter the housing at the inlet, traverse the passage, and exit the housing at the outlet;

a valve body moveable between a valve body closed position and a valve body open position, said valve body blocking the passage when said valve body maintains the valve body closed position such that the valve body is operable to restrict the flow of fluid through the passage when the valve body maintains the valve body closed position, said valve body opening the passage when the valve body maintains the valve body open position such that the valve body is operable to allow the flow of fluid through the passage when said valve body maintains the valve body open position, said valve body actuatable by a trunnion; and a valve seat, said valve seat positioned within said housing, said valve seat moveable relative to both said housing and said valve body between a seating position and a valve seat open position, said valve body seating with said valve seat to enable restriction of the flow of fluid through the passage when said valve body maintains the valve body closed position and said valve seat maintains said seating position, said valve seat spaced from said valve body when said valve seat maintains the valve seat open position such that said valve body cannot contact said valve seat when said valve seat maintains the valve seat open position, whereby said valve body does not impinge on said valve seat when said valve seat maintains said valve seat open position and said valve body maintains said valve body open position, said valve seat mechanically linked to said valve body by a cam comprising a central aperture through which said trunnion is positioned, with a fastener removably, fixedly securing said cam to said trunnion such that said valve seat automatically moves from said seating position to said valve seat open position as said valve body is moved from said valve body closed position to said valve body open position.

6. The valve of claim 5, wherein said cam is secured to the trunnion extending from said valve body, said valve body rotatable about a longitudinal axis of said trunnion.

7. The valve of claim 6, wherein said cam comprises a first cam and wherein said valve further comprises a second cam secured to said trunnion, said trunnion extending from said valve body at a plurality of positions along a perimeter of the valve body, whereby said valve body is interposed between said first cam and said second cam along the longitudinal axis of said trunnion.

8. The valve of claim 5, wherein said valve seat is biased into said seating position.

9. The valve of claim 8, further comprising a spring biasing said valve seat into said seating position.

10. The valve of claim 9, wherein said spring comprises a wave spring.

11. The valve of claim 5, further comprising a cam follower interposed between said cam and said valve seat, said cam follower spaced radially outwardly from an annular sealing surface of said valve seat, said annular sealing surface of said valve seat contacting an annular perimeter of the valve body when the valve body maintains the valve body closed position and the valve seat maintains the seating position.

12. The valve of claim 5, wherein said valve body comprises a butterfly valve.

13. A valve, comprising:
   a housing having an inlet and an outlet fluidly connected by a passage, whereby a flow of fluid can enter the housing at the inlet, traverse the passage, and exit the housing at the outlet;
   a valve body moveable between a valve body closed position and a valve body open position, said valve body blocking the passage when said valve body maintains the valve body closed position such that the valve body is operable to restrict the flow of fluid through the passage when the valve body maintains the valve body closed position, said valve body opening the passage when the valve body maintains the valve body open position such that the valve body is operable to allow the flow of fluid through the passage when said valve body maintains the valve body open position, said valve body actuatable by a trunnion; and
   a valve seat, said valve seat positioned within said housing, said valve seat moveable relative to both said housing and said valve body between a seating position and a valve seat open position, said valve body seating with said valve seat to enable restriction of the flow of fluid through the passage when said valve body maintains the valve body closed position and said valve seat maintains said seating position, said valve seat spaced from said valve body when said valve seat maintains the valve seat open position such that said valve body cannot contact said valve seat when said valve seat maintains the valve seat open position, whereby said valve body does not impinge on said valve seat when said valve seat maintains said valve seat open position and said valve body maintains said valve body open position;
   means for mechanically linking the valve body to the valve seat and for automatically moving said valve seat from said seating position to said valve seat open position as said valve body is moved from said valve body closed position to said valve body open position, said means for mechanically linking comprising a cam comprising a central aperture through which said trunnion is positioned, with a fastener removably, fixedly securing said cam to said trunnion such that said cam actuates said valve seat from said seating position to said valve seat from said seating position to said valve seat open position as said valve body is moved from said valve body closed position to said valve body open position.

14. The valve of claim 13, wherein said cam is secured to the trunnion extending from said valve body, said valve body rotatable about a longitudinal axis of said trunnion.

15. The valve of claim 14, wherein said cam comprises a first cam and wherein said means for mechanically linking the valve body to the valve seat and for automatically moving said valve seat from said seating position to said valve seat open position as said valve body is moved from said valve body closed position to said valve body open position further comprises a second cam secured to said trunnion, said trunnion extending from said valve body at a plurality of positions along a perimeter of the valve body, whereby said valve body is interposed between said first cam and said second cam along the longitudinal axis of said trunnion.

16. The valve of claim 15, wherein said means for mechanically linking the valve body to the valve seat and for automatically moving the valve seat from said seating position to said valve seat open position as said valve body is moved from said valve body closed position to said valve body open position further comprises a spring biasing said valve seat into said seating position.

17. The valve of claim 16, wherein said means for mechanically linking the valve body to the valve seat and for automatically moving said valve seat from said seating position to said valve seat open position as said valve body is moved from said valve body closed position to said valve body open position further comprises: a cam follower interposed between said first cam and said valve seat and interposed between said second cam and said valve seat, said cam follower spaced radially outwardly from an annular sealing surface of said valve seat, said annular sealing surface of said valve seat contacting an annular perimeter of the valve body when the valve body maintains the valve body closed position and the valve seat maintains the seating position.

18. The valve of claim 13, wherein said valve body comprises a butterfly valve.

* * * * *